(12) United States Patent
Thompson et al.

(10) Patent No.: US 7,824,253 B2
(45) Date of Patent: Nov. 2, 2010

(54) SYSTEM AND METHOD FOR PROVIDING REAL WORLD VALUE IN A VIRTUAL WORLD ENVIRONMENT

(76) Inventors: Scott Edward Thompson, 720 Wimbledon La., Hatfield, PA (US) 19440; J. David Thompson, 410 Goldmine Rd, Sellersville, PA (US) 18960

( * ) Notice: Subject to any disclaimer, the term of this patent is extended or adjusted under 35 U.S.C. 154(b) by 265 days.

(21) Appl. No.: 12/061,188

(22) Filed: Apr. 2, 2008

(65) Prior Publication Data
US 2009/0253475 A1 Oct. 8, 2009

(51) Int. Cl.
*G06F 17/00* (2006.01)
(52) U.S. Cl. .......................................... 463/7
(58) Field of Classification Search .............. 463/1, 463/7, 25, 42
See application file for complete search history.

(56) References Cited

U.S. PATENT DOCUMENTS

| 7,330,834 | B1 | 2/2008 | Lapierre |
| 7,386,799 | B1 * | 6/2008 | Clanton et al. ............. 715/758 |
| 7,484,176 | B2 * | 1/2009 | Blattner et al. ............ 715/758 |
| 7,636,755 | B2 * | 12/2009 | Blattner et al. ............ 709/206 |
| 2003/0115132 | A1 | 6/2003 | Iggland et al. |
| 2003/0122858 | A1 | 7/2003 | Mauve |
| 2003/0177187 | A1 | 9/2003 | Levine |
| 2004/0266505 | A1 | 12/2004 | Keam |
| 2005/0192071 | A1 | 9/2005 | Matsuno |
| 2005/0192087 | A1 | 9/2005 | Friedman |
| 2006/0178180 | A1 | 8/2006 | Jung |
| 2006/0234795 | A1 | 10/2006 | Dhunjishaw |
| 2007/0013691 | A1 | 1/2007 | Jung |
| 2007/0024613 | A1 | 2/2007 | Jung |
| 2007/0087820 | A1 | 4/2007 | Van Luchene et al. |
| 2007/0087831 | A1 | 4/2007 | Van Luchene et al. |

(Continued)

FOREIGN PATENT DOCUMENTS

KR 20010093581 10/2001

(Continued)

OTHER PUBLICATIONS

Clark, Don, "Online game hopes to convert virtual cash into real revenue," Wall Street JnI., Jan. 9, 2003.

(Continued)

*Primary Examiner*—Ronald Laneau
(74) *Attorney, Agent, or Firm*—Buchanan Ingersoll & Rooney PC

(57) ABSTRACT

A system and a method is provided wherein real world monetary or cash values are placed on virtual world avatars, avatar possessed or avatar purchasable virtual world items, environmental virtual world items and virtual world computer generated non-player characters (NPCs), such as slayable beasts, monsters, creatures, or humanoids. These NPCs or other avatars (i.e., other players' avatars) have the ability to defeat and collect the cash value of avatars and their gear, thus gaining cash value for the NPC or the avatars. This cash value is then winnable by any avatar with the skill to best the NPC or other avatar. In this system and method, a real world cash value of an avatar is established and can be increased or decreased based upon the avatar's interaction with other avatars, the virtual world environment and/or a player's investment of real world cash value.

16 Claims, 2 Drawing Sheets

U.S. PATENT DOCUMENTS

| | | |
|---|---|---|
| 2007/0155508 A1 | 7/2007 | Sun |
| 2007/0197297 A1 | 8/2007 | Witchey |
| 2007/0218987 A1* | 9/2007 | Van Luchene et al. ........ 463/30 |
| 2008/0004094 A1 | 1/2008 | Mueller |
| 2009/0132416 A1* | 5/2009 | Titus et al. .................... 705/44 |
| 2010/0121729 A1* | 5/2010 | Betzler et al. ................. 705/26 |

FOREIGN PATENT DOCUMENTS

| | | |
|---|---|---|
| TW | 2000701013 A | 1/2007 |
| WO | WO-2006/001776 A1 | 1/2006 |
| WO | WO-2007/124599 A1 | 11/2007 |

OTHER PUBLICATIONS

"Zwinky's virtual cash gets a real-world spin," http://home.zwinky.com/zwinkyhome/main.jhtml.

"Linden Dollars," www.second-life.com/linden_dollars.html.

"Ability to buy in-game items with real-life money," Unofficial World of Warcraft Forums.

"There," www.there.com/parentInfo.html.

"My Maplestory," http://ganxiezhu.blogspot.com/2007/01/my-maplestory.html, 2007.

Hallett-Hook, Fred, "Real Money Trade and Virtual Ownership in Virtual Worlds," http//www.cs.auckland.ac.nz/courses/compsci705s1c/assignments/StudentResearchReports/Virtual%20Worlds%20Money%20Fhal010%20.pdf, Auckland University.

Lehdonvirta, Vili, "Real-Money Trade of Virtual Assets: Ten Different User Perceptions," Helsinki Inst. for Info. Techy. HIIT, 2005.

Pollitzer, Ben K., "Serious Business: When Virtual Items Gain Real World Value," http://papers.ssrn.com, Dec. 1, 2007.

Matsuda, K., "Can we sell a virtual object in a virtual society?," Presence, Dec. 2003, pp. 581-598, vol. 12, No. 6, MIT Press.

"Entropia Universe," MindArk, www.entropiauniverse.com.

\* cited by examiner

SYSTEM AND METHOD FOR PROVIDING REAL WORLD VALUE IN A VIRTUAL WORLD ENVIRONMENT

Virtual worlds are computer-based simulated environments intended for its players to inhabit and interact via avatars. Avatars in virtual worlds can be virtual images or representations such as humanoids, or any other representation of a player, and can be in the form of two or three-dimensional graphical representations. Virtual worlds are generally purposed for interaction between players with one another and with computer-based simulated environments.

Massively Multiplayer Online Role Playing Games (MMORPG) utilize virtual worlds and can include millions of players who often play these games, rather than playing single player stand-alone computer games on their personal console, because of the player interaction. Examples of MMORPGs include Second Life™, There™, World of Warcraft™, and ActiveWorlds™, etc.

In these virtual worlds, the players within the world primarily interact with each other, and interaction with computer systems often occurs to provide tools for interaction between the players. For example, the virtual world platform can be used as a toolbox, wherein the computer system creators, designers, etc. can provide tools to allow the players to build and customize their avatars, as well as items for use by their avatars, such as clothes or houses, etc. Basically, the computer system allows customization of the universe, or "metaverse," as desired by the player within the confines of the computer-based simulated environments.

BRIEF DESCRIPTION OF THE DRAWING FIGURES

SUMMARY

Figure 1:
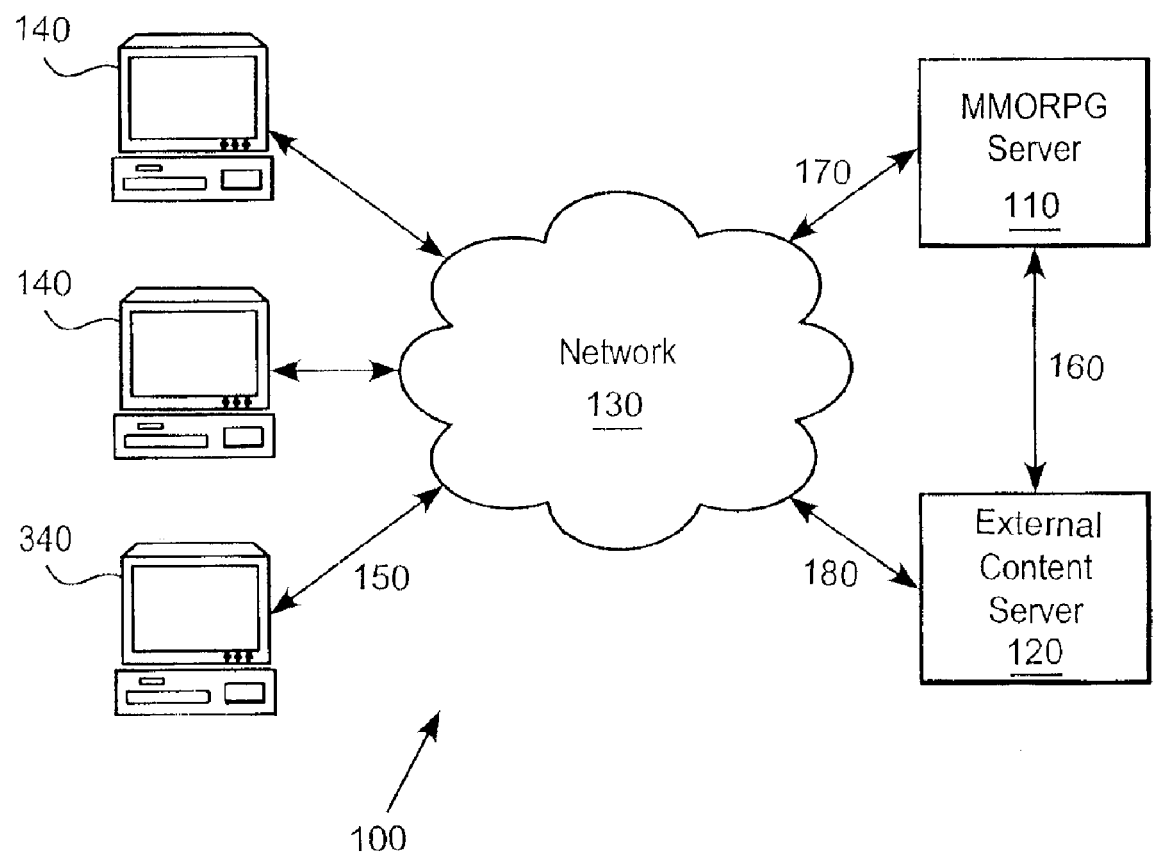
FIG. 1 illustrates an exemplary embodiment of a computer network including local computers and servers.

A system and a method is provided wherein real world monetary or cash values are placed on virtual world avatars, avatar possessed or avatar purchasable virtual world items, environmental virtual world items and virtual world computer generated non-player characters (NPCs), such as slayable beasts, monsters, creatures, or humanoids. These NPCs or other avatars (i.e., other players' avatars) have the ability to defeat and collect the cash value of avatars and their gear, thus gaining cash value for the NPC or the avatars. This cash value is then winnable by any avatar with the skill to best the NPC or other avatar. In this system and method, a real world cash value of an avatar is established and can be increased or decreased based upon the avatar's interaction with other avatars, the virtual world environment and/or a player's investment of real world cash value.

Additionally, virtual world items, such as weapons, armor, etc., can be assigned or can earn cash values, and thus can be bought from, traded to, taken by, or sold to other avatars. These virtual world items, as well as the cash value of the avatars, can be taken by other avatars through competition and tournaments. In other words, some or all of an avatar's cash value and the avatar's virtual world items can be won or lost to another avatar or a NPC.

Also, an avatar's cash value and virtual world items can be placed in a bank or turned into real world money and withdrawn from the game as desired by a player, wherein the cash value of that particular avatar can be decreased if desired. Alternatively, real world cash value can be added to an avatar's real world cash value via a real world cash value deposit, for example, or the avatar can acquire virtual world items from other players or the environment, as other examples.

Competitions, such as individual tournaments, can be provided, wherein avatars compete for real world money. In these competitions, for example, at least two individual players enter their avatars into a competition and in the end one of the avatars is declared the champion.

Other competitions, such as head-to-head duels, team vs. team or a free-for-all multiplayer arena, are also contemplated, wherein teams (i.e., two or more avatars) can be formed and can compete for real world money, wherein at least two competitors enter into a team competition, for example, and at least two teams compete using their avatars and in the end one team of avatars is declared the champion.

Victory can be accomplished in several different ways. For example, victory can be achieved by surviving a multiplayer arena type setting, or victory can be achieved by fulfilling a game requirement.

Prize winnings can also vary as desired. For example, avatars can have the ability to enter unique tournaments in which each avatar starts with its own unique bounty value, competes, and wins instant cash that cannot be lost even if the avatar is defeated and regardless of the round of play the avatar leaves the game.

Disclosed is a system for providing real world monetary values in a virtual world environment, comprising: a computer for storing real world monetary values of an avatar; a computer for storing real world monetary values on virtual world items; and a computer for hosting a competition between avatars in a virtual world environment, wherein a first avatar can defeat a second avatar and the real world monetary values and the virtual world items of the second avatar are transferred to the first avatar.

Also disclosed is a method for providing real world monetary values in a virtual world environment, comprising: providing real world monetary values on an avatar; providing real world monetary values on virtual world items; and providing a competition, wherein a first avatar can defeat a second avatar and the real world monetary values and the virtual world items of the second avatar are transferred to the first avatar.

DETAILED DESCRIPTION

As used herein, the terms "player" and "competitor" are synonymous and are utilized to signify a person who is playing on the system provided herein and/or utilizing the method provided herein.

As used herein, the term "avatar" is utilized to signify the virtual world representation of the player or competitor.

As used herein, the terms "real world monetary value," "real world cash value" and "cash value" are synonymous and are utilized to signify actual cash, such as United States dollars or other legal tender.

As used herein, the term "computer" is utilized to signify a computerized system, such as a server, which operates to implement the exemplary embodiment systems and methods described herein.

As used herein, the terms "competition" and "tournament" are utilized to signify player vs. player interactions, such as one-on-one, two-on-two, three-on-three, team play, etc. Competitions and tournaments can be formalized single round or multiple round events or can be informal individual or team activities. Competitions and tournaments can be based on any type of games, for example, battle or war type games, sports games, strategy games, etc.

As used herein, the term "virtual world item" is utilized to signify items within the virtual world that can be possessed by avatars and can include real world cash values associated therewith, if desired. Virtual world items include those that can be: purchased from or sold to vendors within the game, crafted using materials from within the game, or acquired through interactions with the virtual world environment, such as by looting the items off of NPCs or from drops from the environment, such as items collected from the environment.

In one exemplary embodiment, a system is provided, wherein tournaments or other competitions are held between avatars, wherein players' skills can be tested against other players in a winner-take-all type of competition. The attributes of the avatars, including their real world monetary values and their virtual world items, can be stored on a computer. The values of the avatars and their possessions can be displayed such that avatars with higher values may be challenged more often than those with lower values. On the other hand, avatars with lower values can take on other avatars with lower values in order to raise their values. In other words, the value of an individual avatar can be increased by taking the values, in terms of their cash value and/or their virtual possessions, as a prize for beating another avatar in a competition.

Avatars have the ability to enter unique tournaments in which each avatar starts with its own unique bounty value, competes, and wins instant cash that can not be lost even if the avatar is defeated and regardless of the round of play the avatar leaves the game.

For example, a tournament can be held, wherein each competitor puts all of their avatar's cash value, as well as their avatar's items, on the line in a winner-take-all competition. The winning avatar would gain the entirety of the cash value and/or all of the virtual items of the losing avatar and the losing avatar would be left with no cash value and/or virtual items. The tournament can be hosted on a computer providing an environment in which a competition between competitors, by ways of their avatars, can be conducted and the cash value of the losing avatar can be transferred to the winning avatar.

One example of how access to a competition or tournament is illustrated in FIG. 1. As illustrated in FIG. 1, a system 100 including a MMORPG server 110, an external content server 120, such as a tournament server and/or a cash value storage memory, a network 130, and local computers 140 can be provided.

First, a player can select a tournament to play by selecting it through their local computer 140. Next, the local computer 140 can connect 150 to the network 130, wherein the network 130 can send the signal to the MMORPG server 110 and the external content server 120. The external content server 120 further connects 160 to the MMORPG server 110.

Second, a signal including personal information about the player, such as their name or other identifier and payment information, can be forwarded 170, 180 to the MMORPG Server 110 and/or the external content server 120. Alternatively or additionally, information about the player's avatar can be forwarded. The forwarded information can be provided as a local signal 150 to the network 130 from a local computer 140 and in turn be forwarded through the network 130 to the MMORPG server 110 through a first signal 170 or to the external content server 120 through a second signal 180 to the external content server 120. It is noted that other information can be carried in the local signal 150, the first signal 170 and the second signal 180.

Third, the player can be charged by the external content server 120 for the entry fee for a tournament or other real world cash value, as desired. This can occur by a computer process of authorizing payment to the external content server 120 or recognizing a player and the player's corresponding account, etc.

Fourth, tournament or competition content 130 can be transmitted from, for example, an internal database within the virtual world (e.g., the MMORPG server 110 or databases linked thereto) or an external database networked to the virtual world system 100 (e.g., the external content server 120 or databases linked to the system 300) containing the available content. The transmission, if provided by an external database, can be transferred in the form of an interactive content stream 160 to the MMORPG server 110. Thus, the virtual world location where the player's avatar is located can receive the content, wherein the content can be uploaded into the virtual space where the player's virtual viewing device is located.

Figure 2:
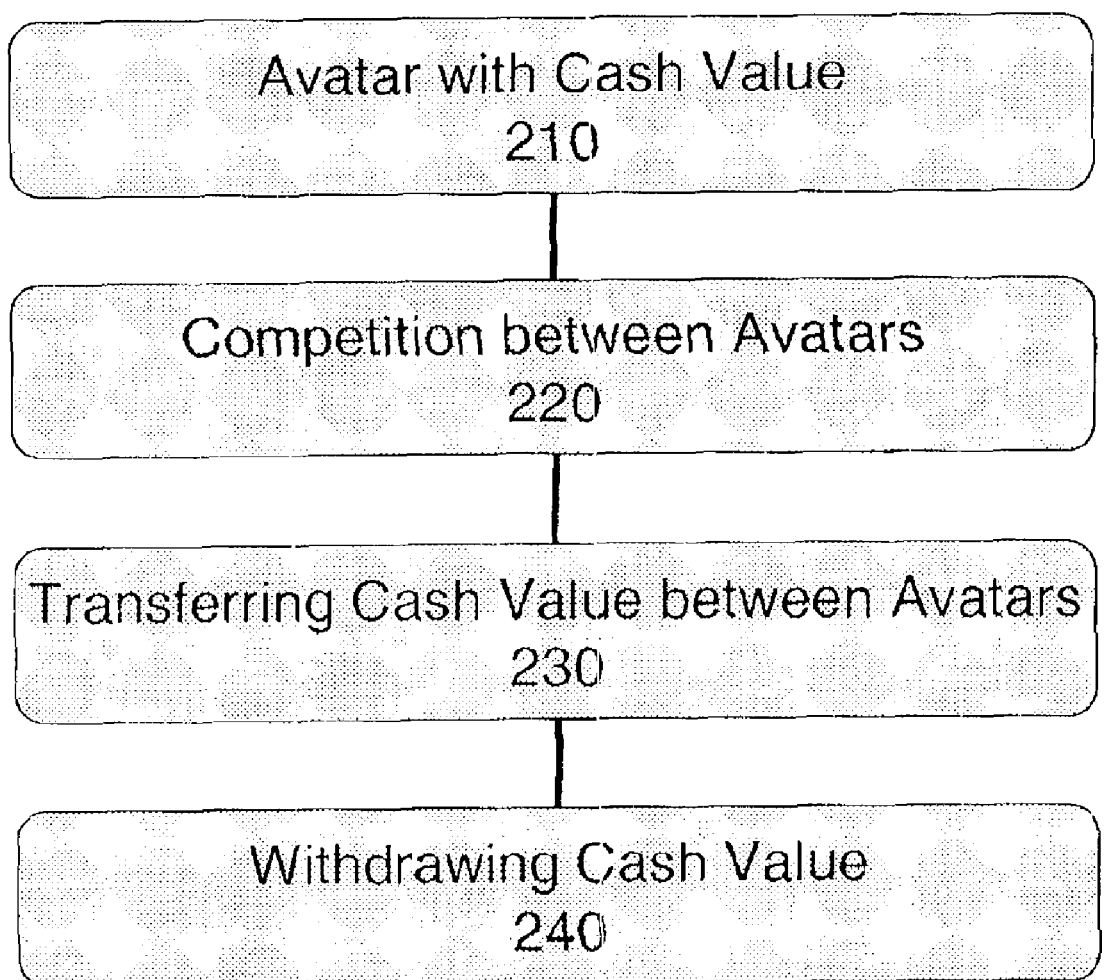
FIG. 2 illustrates an exemplary embodiment of a method of providing an online tournament.

As an exemplary embodiment, a method of providing an online tournament is illustrated in FIG. 2. As illustrated in FIG. 2, the method can include providing a first avatar with an associated cash value 210, providing a competition by which a designated portion of the first avatar's associated cash value is transferred to a second avatar 220, transferring the designated portion of the first avatar's associated cash value to the second avatar 230, and providing real world cash value associated with the designated portion of the first avatar's associated cash value to the player who is playing the second avatar by allowing the player to withdraw cash value if so desired 240.

Game avatars can, for example, have real cash bounties placed on their heads. The value of an avatar can increase with each opponent bested and bounty won. As one exemplary embodiment, a scenario wherein portions of an avatar's value can be maintained is provided. For example, one third of a bounty (or any fraction of the bounty) won can be immediately transferred and can remain as earned cash even if the avatar is slain immediately after the posted bounty win. As further contemplated, the next third of the won bounty can be added into the winning avatar's cumulative cash bounty which can be the total cash value of the avatar or some fraction thereof as predetermined by the rules of the competition or tournament or individually selected by the player(s). This cash bounty can be immediately winnable, in total or by fractions, by other competing players though their avatars. The last third can be added to the character's over-all bounty or cash value. This over-all bounty can be revealed or broadcasted, as desired, the next time the winning avatar enters a new tournament.

As a result, avatars having separate and unique cash values at the start, middle, and end of any tournament can be provided. Additionally, their cash value can be altered throughout a tournament and can thus create new and exciting ways to play tournaments. For example, a player's goal can be to take out an adjacent avatar that is worth $100 instead of going for cumulative cash kills. As an alternative strategy, a player could decide to hang back and snipe at the backs of those avatars that have targeted the $100 value avatar.

In an exemplary embodiment, an avatar is provided that won $150 total in a previous tournament can start a new tournament with a $50 bounty (⅓ the $150) on his head. His high level of skill allows him to beat off three immediate attackers (at the start of the tournament) that attempt to score his $50 bounty. He adds the bounties of the three defeated avatars (for example, if each of the three attackers were worth $10 each, totaling $30) to his account, the player can pocket $10 immediately, while $10 goes to his cumulative cash bounty (now totaling $60), and $10 goes toward a bounty he can use to start the next future tournament. If he is defeated, he still keeps the $10 he won earlier and the $10 toward the future tournament. The avatar which defeated him wins his cumulative bounty of $60 with $20 going immediately to cash in her pocket, $20 is added to her cumulative bounty, and the last $20 of the $60 goes toward a bounty that she can use to start a future tournament.

Other types of tournaments are also contemplated herein. For example, tournaments based on survival rather than conquering can be implemented. Games such as a "King of the Hill" type can used as tournament formats.

For example, combat tournaments using medieval weaponry, military weaponry, or futuristic weaponry, for example, can be the basis for a survival type tournament. In one example, a field of battle can disintegrate around a perimeter of the playing field forcing combat inward toward the field of battle's center. Any avatar caught in the disintegrating areas is eliminated from the competition. The disintegration may be a floating chunk of land that crumbles inward or merely a moving visual indicator. Avatars may be thrown or pushed into the disintegrated zone to be eliminated, or can simply fall away as the land crumbles. Falling characters may still fight and kill other characters that are falling with them—right up until they are terminated, for example, they could take fall damage and die.

Similarly, a field of battle may be a stepped pyramid in a valley that is filling up with lava. The rising lava forces avatars up the pyramid until only one can remain standing in a "King of the Hill" type of winning scenario. Also, combat may occur in a city where falling buildings crush avatars that remain on the outskirts of combat for too long. Crashing buildings force avatars into the center until only one remains standing.

Another type of tournament can be one in which teams are formed and lead to a common goal. For example, teams can be formed through loose associations, or can be formed as "mercenaries," in which players are individually paid by a team owner or captain to achieve a specific goal, wherein the prize can be allocated to the entire team or to the team owner or captain alone.

For example, game avatars can be provided with or can earn individual marketable skills allowing for players to be hired out to compete and win for the benefit of a team owner or captain that can be in the form of Warlord, for example. As characters compete, the game keeps track of their combat stats. Players may choose to publish their abilities and previous achievements, and thus can make a living as a mercenary. As contemplated herein, mercenaries are capable of being hired by other players under an agreement, for example, that services rendered are for an up front fee in exchange for all game winnings going to the purchaser of the mercenary's services. Alternatively, a mercenary can be provided with a portion of the winnings for further incentive to join a particular team and to win. The net result of this could be a hired army fighting for the top cumulative posted prize.

As another exemplary embodiment, a captain of a ship can offer $20 to individuals to entice them to sign up and become members of his crew, wherein the individuals would crew the captain's ship and guns. As contemplated herein, the captain can select and pay each of these crew members based on their negotiations and records from previous battles, wherein stellar players may be paid more than average players and certain positions, such as steersman, might be paid more than other positions, such as gunmen.

As envisioned, members of the crew can sign on, by literally taking $20 cash and joining the captain's team, for example, in exchange for waiving all or a portion of their claim to the winnings. The ship can then set sail for a tournament at sea after the crew is selected. It is envisioned that filling the crew can take minutes, days, weeks, or months depending upon the tournament outline. In one exemplary embodiment, 1000 Tall ships, each with their own captains and crews, can be set to compete for supremacy of the sea. Each crew member can contribute a small portion of their bounty to the captain's over-all bounty in exchange for their joining the ship. The ships can go to war, blowing each other apart with cannon fire as crew kills crew with muskets and rapiers all the while trying to board and capture opposing ships. Experienced captains can be higher bounty targets as they may have a higher cumulative bounty of the crew (because better players may want to join this particular captain due to the captain's superior skill or perhaps higher payments to the crew members) and perhaps previously won bounties from other tournaments that could add to a higher residual value for that ship. Killing the captain, sinking a ship, or stealthily capturing a ship's flag can all be victory conditions with the transfer of losing ship's avatar values being transferred in the conquering ship and the conquering ship's captain and/or crew members.

As another example, a warlord could offer $20 to mercenaries who will protect him through a combat tournament, with all winnings going to the warlord. He can select and pay each of these mercenaries based on their skills, experience, and/or game statistics from other battles. Similar to the crew members discussed above, these mercenaries can sign on, for example, by literally taking $20 cash, in exchange for all winnings, wherein the mercenaries have the incentive to win based upon their own reputation for future hiring, as well as the enjoyment of being selected by a superior warlord.

Additionally, as another example, a "Capture the Flag" type of game can be utilized. For example, teams can divide their forces into defense and attack groups and move through city or country environments with the goal of taking out opposing forces, capturing the flag, and returning it to their base. Players can win cash by killing opposing team members and taking the cash values of the defeated opposing team members and/or win a cash prize of an amount from the losing team or an entry fee value should they capture the flag.

Alternatively, teams or groups can be loosely associated with one another for the purpose of achieving a goal. For example, a group of avatars can work in concert to invade or defend a castle's walls to take or defend the castle (or a flag therein, for example). In this example, a time limit can be set that forces the invaders to invade. Failure to take the walls by the expiration of the time bank leads to victory for the defenders. Players fight to the death, with those avatars still alive at the end from the winning team taking the cash prize of the value of the opposing team's avatars. Play can open with a cannon fire bombardment launched from both sides. Players may choose to hide and let others die so the reward is higher when entering combat for the win, or they may choose to be at the front of the action where they may gain and immediately pocket a portion of the cash value of those they slay.

By providing a variety of competition formats, relationships for strategies can be formed. For example, alliances between superior players can be formed, wherein players may make on the spot alliances in the last few moments before a tournament begins, vowing to cover each other's backs until they are the last ones standing. This situation can be mutually beneficial and can likely be a winning strategy.

On the other hand, other strategies with less cooperative relationships can also be implemented. For example, a beginner avatar may sneak along behind a very experienced fighter, plying his bow and arrows to kill an avatar that the experienced fighter had been fighting, thus stealing the kill and winning the defeated avatar's cash value. This would probably not go unnoticed by the experienced fighter for very long, and could end up an eventual competition between the two, wherein the beginner avatar may still end up making cash.

One example of a smaller team setting tournament can be an assassination team vs. defense team type of play. For example, 2 groups of avatars can enter a game by paying an entrance fee. The entrance fee for the assassination team can be posted as both a bounty on each of their heads and a cumulative sum that can be won by the defense team in charge of keeping the assassination target alive. The defense team can also post their entry fee which can similarly be divided as a bounty and over-all win value should the target they are defending be killed. The assassination target, for example, must be delivered to a predetermined zone within the game, such as a courthouse, before a time limit expires for the defense team to win.

As envisioned herein, any number of ruses can be utilized to disguise the assassination target. For example, an assassination team may disguise themselves as NPCs in the game. A wide variety of weapons can be used on both sides, such as explosives for exploding buildings, and various hand-held weapons (guns, knives, etc.). The defense team may mark a likely assassinators and have NPC police characters investigate suspicious characters. The assassination team may take out NPCs such as the police and civilians as they see fit, but with the risk of marking themselves as a assassinators for defenders to eliminate and having the entire police force descend upon him for defenders to eliminate. Avatar values can be split into 2 parts, those immediately won when killed, and a cumulative cash pool should your team lose to the opposition, for example.

As another example, an avatar can attempt to make it through an obstacle course in the fastest time while defending itself against attacks from other players and NPCs. Avatar cash values can again be divided into a bounty and a cumulative win amount. Eliminating an avatar scores the bounty and is pocketed instantly by the winner regardless of how the player places in the race. This can open up a whole new level of competition in that players may decide to just plant themselves in front of the running crowd and take out as many as possible to score as much instant cash as possible. On the other hand, other players can decide to run as fast as possible to try to make it to the end and win the cumulative cash for the race. Yet still others can hang back, allow those that wish to fight to become engaged with other characters, then run by or join the melee from behind.

As an alternative to warlike games, sports games, such as golf as mentioned above, can also be implemented herein. For example, avatars can start off with a winnable cash amount each. All players can play simultaneously and know the value of the other players, as well as the prize for the winning or lasting through each round. Money can be won or lost (i.e., subtracted or added to an avatar's value) based on accuracy of shots such as prizes for a longest drive, eagles, birdies, first on green bonuses, and speed of hole completion. Bonuses can be pocketed immediately and can be made perpetual throughout the tournament in that the bonuses cannot be lost even if the player is eliminated in the round. Additionally, eliminations can occur based on speed of round completion and cut off stroke scores (Par for the hole) to set up side games for further competition. For example, players may choose to focus only on scoring bonuses and cashing out immediately, or can play in a rushed manner to get to the green first regardless of stroke count. Alternatively, a player may choose to take their time to make sure they maintain an optimum low stroke count to move up in the game's levels where higher cash values can be won.

In exemplary systems and methods, the cash value of an avatar can also be raised or lowered by a real world cash deposit or withdrawal, in that the player of the avatar can put real world money into or take real world money out of the cash value of their avatar. For example, after a victory over a high value avatar is completed, a player can withdraw some or all of their winnings, as well as some or all of their avatar's overall value, before another competition is held. Alternatively, after a loss, a player can deposit more cash value into their avatar to continue playing (if the competition is not a single elimination tournament, for example).

Additionally, real world money can be used to increase the abilities of the avatars, such as by purchasing better equipment for the competitions. By purchasing improved armor and/or weapons, improved viability of the avatar's damage causing abilities, as well as the avatar's survivability in a competition or tournament can be provided. In other words, real world cash investments can be made in order to increase an avatar's probability of defeating another avatar.

Additionally, real world money can be used, for example, to purchase packages of gear that alter as needed so a player can use them across a wide variety of games. These packages can be bought or sold to any game's shop. For example, a "Level 1" package might include starter gear for a new Customer/Avatar. For a combat game, this gear might include a starter weapon, and a piece of light armor, then when a customer enters a different game, such as a golf game, that Level 1 equipment is accessible in the form of a starter driving club, a starter chipping club, and a starter putter club.

Similarly, if a "Level 5" package is purchased, access to premium gear can be provided. For example, a Level 5 package might include superior weapons and armor for a combat game, or expert level clubs and golf clothing for a golf game. Alternatively, a Level 5 package might include access to all lower levels such that any weapons, armors, or equipment available in Levels 1 through 4, as well as additional Level 5 items, are accessible.

Also, all levels of players can be encouraged to compete based upon their level of skill. For example, players of higher skill can seek out other players of higher skill by looking for increased avatar values and increased avatar possession values. Conversely, players of lower skill can seek out other players of lower skill by looking for decreased avatar values and decreased avatar possession values. Alternatively, players of higher skill could reduce their avatar's values and appear to be avatars of lower skill and challenge other avatars with lower values; however, the rewards for success would be diminished compared to taking on higher valued avatars. Alternatively, these "reduced cash value" avatars can compete with higher cash value avatars with reduced risk and increased rewards, if so desired.

In another exemplary environment, informal individual competitions can be held between competitors without a formalized tournament. For example, a competitor can be playing in a player vs. environment setting, and then can be offered a competition by another player. If accepted, the avatars of the competitors can do a head-to-head competition with a set prize, such as a fixed amount of real world cash or particular virtual items, or with a winner-take-all prize.

Competitions can be held between competitors in any number of platforms. For example, in the WORLD OF WARCRAFT®, a duel can be requested between competitors, wherein the winner can be determined based upon a match in which the winner reduces the loser's health down to 1% of their total health. Competitors are allowed to utilize any and all of their attributes and abilities, but a limited size zone and time limit are provided. Other avatars, and thus the people playing the other avatars, can watch the competition but are not allowed to assist either competitor.

As another example of a competition, a tournament can be conducted in which competitors can be eliminated or can be handicapped based upon the previous competitions. For example, a winner-take-all bracket competition can be conducted in which a large field of competitors competes one-on-one through various rounds until a single winner is determined. In this example, the winner of the competition would then have all of the real world cash value, as well as the virtual world items, of each player that entered into the tournament.

Alternatively, percentages of each win can be transferred to the winner such that winners of the first round, second round, etc., who do not end up winning the entirety of the tournament are still awarded values based upon the values of those competitors they defeated.

As another exemplary embodiment, the real world cash values of avatars can be increased through the virtual world itself. In other words, real world cash values can be placed on environmental virtual world items and virtual world computer generated NPCs. For example, a real world cash value can be placed on virtual world items that can be collected, such as parts needed to craft weapons and/or armor. Alternatively, a real world cash value can be placed on the slaying of monsters, wherein higher cash values can be associated with higher difficulty monsters.

As another exemplary embodiment, the real world cash value can be held in the virtual world or in the real world. Access to the real world cash value can be fluid between the virtual world and the real world similar to a pair of linked accounts. These accounts can be like ordinary bank accounts that accrue interest and are available for additional deposits and withdrawals.

As another exemplary embodiment, stores and shops can be provided wherein purchasable items can be acquired using real world cash value or can be sold back to the stores and shops for real world cash value. These stores and shops can have fixed values or fluctuating values as desired. Additionally, virtual world items could be transferred between avatars and can be sold between avatars.

One method of implementing this system is to assign unique identifier codes to avatars, items and virtual world NPCs. Thus, in order to verify the existence and value of avatars, items and virtual world NPCs, the unique identifier code can correspond to a particular set or fluctuating value that can be made inaccessible to players in that virtual world and can be controlled by a system administrator. This allows for the accuracy of the real world cash values of the avatars, items and virtual world NPCs on an individual basis and can be utilized to reduce possible fraud.

In another embodiment, the real world cash values can be converted into virtual world currency or can remain in real world cash value. For example, a virtual world currency can have a direct or indirect relation to real world cash value, and either can be used for the purchase or sale of items, wherein real world cash value can be withdrawn from the virtual world as desired.

As another example of a competition, a tournament can be conducted in which competitors can win crowd favor. Crowd favor, measured by cheering vote, adds combat power to their champion.

Cash prizes can also be so large as to create media attention. These specialized tournaments can be televised or streamed by computer devices for the enjoyment of all, including those not subscribed to the game.

A number of different payment methods could be used, as mentioned above. For example, the player can input a financial card (e.g., a debit card, credit card or gift card) number within their player account in the virtual world, can input a financial card number directly through a pop-up standard payment interface, or can use virtual currency as part of the virtual world for use as payment for the viewable content. Payment methods, such as financial cards (e.g. credit and debit cards), Internet payment services, such as Paypal™, or virtual world currency, such as Linden Dollars™, can be used. Once payment is made, a local signal 150 can be transmitted to the network and in turn to MMORPG server 110 or the content server 120, wherein upon payment, the external content server 120 can provide a content stream 160 to the MMORPG server 110 to provide the access to a tournament.

In order to allow for the viewable content to be provided in the virtual worlds, a database can be employed, as mentioned above. Any SQL compliant database could be used to design the necessary database (e.g., Oracle, MySOL, or Microsoft SQL Servers), wherein sending and receiving data from the database to the virtual world, or creating any external interfaces can be done by using a programming language. Non-limiting examples of languages that could be used include Java, C, PHP, and ASP. Exemplary databases can provide storage for viewable content information, such as the name of the viewable content, the description, peer review ratings, motion picture content ratings, the price, the duration that the player can have access to the viewable content the methods of communicating with the virtual world in which the content is to be displayed, categories or genres of the available videos, to name a few.

The viewable content can be identified by a Uniform Resource Locator (URL). The URL can be used as a temporary URL for each individual instance of the viewable content accessed. The URL can then be programmed to automatically expire after the access time has ended.

It will be appreciated by those skilled in the art embodiments in other specific forms can be achieved without departing from the spirit or essential characteristics thereof. The presently disclosed embodiments are therefore considered in all respects to be illustrative and not restricted. The scope of the claims rather than the foregoing description and all changes that come within the meaning and range and equivalence thereof are intended to be embraced therein.

The invention claimed is:

1. A method of providing an online tournament, comprising:

providing by a server-computer a first avatar of a first player with an associated cash value, said cash value being stored in the server-computer;

providing by the server-computer a competition between the first avatar of the first player and a second avatar of a second player, wherein the first player and the second player access the competition via a network using respective player-computers;

determining by the server-computer a designated portion of the first avatar's associated cash value to be transferred to the second avatar;

transferring by the server-computer the designated portion of the first avatar's associated cash value to the second avatar; and providing real world cash value associated with the designated portion of the first avatar's associated cash value to the second player, wherein:
the second avatar defeats the first avatar by winning a competition, said winning comprising the second avatar eliminating the first avatar from the competition, the second avatar accruing more points than the first avatar over a fixed time period, or the second avatar achieving a goal before the first avatar, and the designated portion of the first avatar's associated cash value is immediately transferred to the second avatar when the second avatar defeats the first avatar in the competition.

2. The method of claim 1, wherein the competition comprises war battles, hand-to-hand combat, team vs. team combat, survival combat, sporting events, or strategy games.

3. The method of claim 1, wherein:
the first avatar is part of a first team of avatars and the second avatar is part of a second team of avatars, and
the transferring of the designated portion of the first avatar's associated cash value to the second avatar includes, transferring said associated cash value when the second team of avatars defeats the first team of avatars.

4. The method of claim 1, wherein providing the competition includes:
in the event a non-player character (NPC) defeats the first avatar, storing the first avatar's cash value in association with the NPC, and
providing the value of the first avatar as a winnable prize to another avatar that defeats the NPC.

5. The method of claim 1, wherein providing the competition includes allowing real world cash value to be won regardless of a game score.

6. The method of claim 1, wherein the associated cash value comprises an initial investment amount by a player of the first avatar, previous winnings from previous tournaments by the first avatar, virtual world items purchased or won by the player of the first avatar prior to the online tournament, and/or at least a portion of an entry fee for the online tournament.

7. A system for providing a competition in a virtual world environment, said system comprising a processor and an information storage device having program instructions and information recorded thereon that, when executed by the processor, control the system to:
provide a first avatar of a first player with an associated cash value;
provide a competition between the first avatar of the first player and a second avatar of a second player, wherein the first player and the second player access the competition via a network using respective player-computers;
determine a designated portion of the first avatar's associated cash value to be transferred to the second avatar;
transfer by the server-computer the designated portion of the first avatar's associated cash value to the second avatar; and
provide real world cash value associated with the designated portion of the first avatar's associated cash value to the second player, wherein:
the second avatar defeats the first avatar by winning in a competition, said winning comprising the second avatar eliminating the first avatar from the competition, the second avatar accruing more points than the first avatar over a fixed time period, or the second avatar achieving a goal before the first avatar, and
the program instructions control the system to transfer designated portion of the first avatar's associated cash value to the second avatar when the second avatar defeats the first avatar in the competition.

8. The system of claim 7, wherein the program instructions further control the system to:
in response to a selection of a tournament received over a network from a player-computer, provide the selected tournament to the player-computer using a MMORPG server and a external content server.

9. The system of claim 8, wherein the program instructions further control the system to:
receive personal information about the player and/or the player's avatar, and
forward said information to an online role-playing game server or a external content server.

10. The system of claim 7, wherein the program instructions control the system to charge an entry fee for a tournament or other real world cash value by a computer process of authorizing payment to the external content server.

11. The system of claim 7, wherein the program instructions control the system to transmit content of the competition from n online role-playing game server to an external content server in the form of an interactive content stream.

12. The system of claim 7, wherein the competition comprises war battles, hand-to-hand combat, team vs. team combat, survival combat, sporting events, or strategy games.

13. The system of claim 7, wherein:
the first avatar is part of a first team of avatars and the second avatar is part of a second team of avatars, and
the program instructions control the system to transfer the designated portion of the first avatar's associated cash value to the second avatar when the second team of avatars defeats the first team of avatars.

14. The system of claim 7, wherein the program instructions control the system to, in the event a non-player character (NPC) defeats the first avatar in the competition, store the value of the first avatar in association with the NPC, and provide the value of the first avatar to another avatar that defeats the NPC.

15. The system of claim 7, wherein the program instructions control the system to award real world cash value regardless of a what players score in the competition.

16. The system of claim 7, wherein the associated cash value comprises an initial investment amount by a player of the first avatar, previous winnings from previous tournaments by the first avatar, virtual world items purchased or won by the player of the first avatar prior to the online tournament, or at least a portion of an entry fee for the online tournament.

* * * * *